US009426699B2

(12) United States Patent
Son et al.

(10) Patent No.: US 9,426,699 B2
(45) Date of Patent: Aug. 23, 2016

(54) APPARATUS AND METHOD FOR CONTROLLING RELAY MODE OF BASE STATION IN COMMUNICATION SYSTEM

(75) Inventors: Yeong-Moon Son, Yongin-si (KR); Kyung-Kyu Kim, Seoul (KR); Rakesh Taori, Suwon-si (KR); Young-Bin Chang, Anyang-si (KR); Jae-Hyuk Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1210 days.

(21) Appl. No.: 13/410,791

(22) Filed: Mar. 2, 2012

(65) Prior Publication Data

US 2012/0225655 A1 Sep. 6, 2012

(30) Foreign Application Priority Data

Mar. 4, 2011 (KR) .................. 10-2011-0019393

(51) Int. Cl.
*H04W 36/00* (2009.01)
*H04W 36/30* (2009.01)

(52) U.S. Cl.
CPC ......... *H04W 36/0055* (2013.01); *H04W 36/30* (2013.01)

(58) Field of Classification Search
CPC ............ H04W 36/0055; H04W 36/30; H04L 12/5875; H04L 25/08
USPC ......... 455/436–444, 450; 370/216, 242, 315, 370/331, 221
See application file for complete search history.

(56) References Cited

U.S. PATENT DOCUMENTS

| 2011/0053599 | A1* | 3/2011 | Hsu et al. | 455/436 |
| 2011/0317544 | A1* | 12/2011 | Chou | 370/216 |
| 2012/0002537 | A1* | 1/2012 | Bao et al. | 370/221 |

* cited by examiner

Primary Examiner — Wayne Cai
(74) Attorney, Agent, or Firm — Jefferson IP Law, LLP

(57) ABSTRACT

An apparatus and a method for providing a relay service in a Base Station (BS) of a communication system are provided. The method includes detecting a communication state with a backhaul of the communication system, transmitting backhaul error occurrence information to at least one Mobile Station (MS) located in a service coverage area when communication with the backhaul is interrupted, selecting a neighbor BS from among one or more neighbor BSs as a target BS, and providing a relay service by connecting with the target BS.

16 Claims, 10 Drawing Sheets

APPARATUS AND METHOD FOR CONTROLLING RELAY MODE OF BASE STATION IN COMMUNICATION SYSTEM

PRIORITY

This application claims the benefit under 35 U.S.C. §119 of a Korean patent application filed in the Korean Intellectual Property Office on Mar. 4, 2011 and assigned Serial No. 10-2011-0019393, the entire disclosure of which is hereby incorporated by reference.

BACKGROUND OF THE INVENTION

1. Field of the Invention

The present invention relates to an apparatus and method for providing a relay service in a communication system. More particularly, the present invention relates to an apparatus and method for controlling a Base Station (BS) to provide a relay service in a communication system.

2. Description of the Related Art

A communication system includes a relay service in order to provide service coverage extension or improve network reliability. For example, the communication system may use a Relay Station (RS) to provide a relay service. As another example, the communication system may use a Base Station (BS) and a Mobile Station (MS) to provide a relay service.

As described above, a BS of a communication system may operate in a relay mode in order to provide a relay service. However, related-art communication standards do not provide specific conditions for a relay mode operation of a BS. Thus, when a BS converts or switches to a relay mode at a certain place or location, the BS operating in the relay mode may interfere with another RS, thus reducing transmission efficiency of the communication system. Accordingly, there is a need for specific conditions for a relation mode operation and a relay mode conversion of a BS in the communication system.

SUMMARY OF THE INVENTION

Aspects of the present invention are to address at least the above-mentioned problems and/or disadvantages and to provide at least the advantages described below. Accordingly, an aspect of the present invention is to provide an apparatus and method for providing a relay service by a Base Station (BS) in a communication system.

Another aspect of the present invention is to provide an apparatus and method for controlling a relay mode of a BS in a communication system.

Another aspect of the present invention is to provide an apparatus and method for converting a BS to a relay mode in a communication system.

Another aspect of the present invention is to provide an apparatus and method for converting a BS to a relay mode in a communication system when communication with a backhaul is interrupted.

According to an aspect of the present invention, a method for a relay service in a BS of a communication system is provided. The method includes detecting a communication state with a backhaul of the communication system, transmitting backhaul error occurrence information to at least one MS located in a service coverage area, when communication with the backhaul is interrupted, selecting a neighbor BS from among one or more neighbor BSs as a target BS, and providing a relay service by connecting with the target BS.

According to another aspect of the present invention, a method for controlling a relay service of a neighbor BS in a BS of a communication system is provided. The method includes determining whether communication between the neighbor BS and a backhaul is interrupted upon receiving a connection request from the neighbor BS, determining control information for a relay mode conversion of the neighbor BS, when the communication between the neighbor BS and the backhaul is interrupted, and transmitting the control information to the neighbor BS.

According to another aspect of the present invention, a method for performing communication in a Mobile Station (MS) of a communication system is provided. The method includes determining whether to perform a handover of the MS upon receiving backhaul error occurrence information from a serving BS having provided a communication service to the MS, operating the MS in a Reception (RX) standby mode upon determining not to perform the handover, and communicating signals through the serving BS upon receiving relay service provision information from the serving BS.

According to another aspect of the present invention, an apparatus for a relay service in a BS of a communication system is provided. The apparatus includes a wired interface for transmitting and receiving signals through a backhaul of the communication system, a backhaul state detecting unit for detecting a communication state with the backhaul, a control unit for controlling transmitting of backhaul error occurrence information to at least one MS located in a service coverage area, when communication with the backhaul is interrupted, and for providing a relay service by connecting with at least one BS from among one or more neighbor BSs, and a transmitting unit for transmitting signals.

According to another aspect of the present invention, an apparatus for controlling a relay service of a neighbor BS in a BS of a communication system is provided. The apparatus includes a receiving unit for receiving signals, a control unit for determining control information for relay mode conversion of the neighbor BS in a connection request signal of the neighbor BS received through the receiving unit upon determining that communication between the neighbor BS and a backhaul is interrupted, and a transmitting unit for transmitting the control information to the neighbor BS.

According to another aspect of the present invention, an apparatus for performing communication in an MS of a communication system is provided. The apparatus includes a receiving unit for receiving signals, and a control unit for controlling determining whether to perform a handover upon receiving backhaul error occurrence information from a serving BS through the receiving unit, for controlling operating the MS in an RX standby mode upon determining not to perform a handover, and for controlling communicating of signals through the serving BS upon receiving relay service provision information from the serving BS through the receiving unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The exemplary embodiments of the present invention provide a scheme for controlling a relay mode of a Base Station (BS) in a communication system. When communication with a backhaul is interrupted, the BS of the communication system converts or switches to a relay mode in order to provide a relay service. For example, it is assumed that the BS determines that communication with the backhaul is interrupted when communication with an Access Service Network-GateWay (ASN-GW), which may be one of a plurality of network constituting nodes connected through the backhaul, is interrupted. However, the BS may also determine that communication with the backhaul is interrupted when communication with another network constituting node, i.e., one that is not the ASN-GW, is interrupted.

In the following description, it is assumed that the BS supports a relay mode. That is, it is assumed that the BS may convert to a relay mode in order to provide a relay service.

Figure 1:
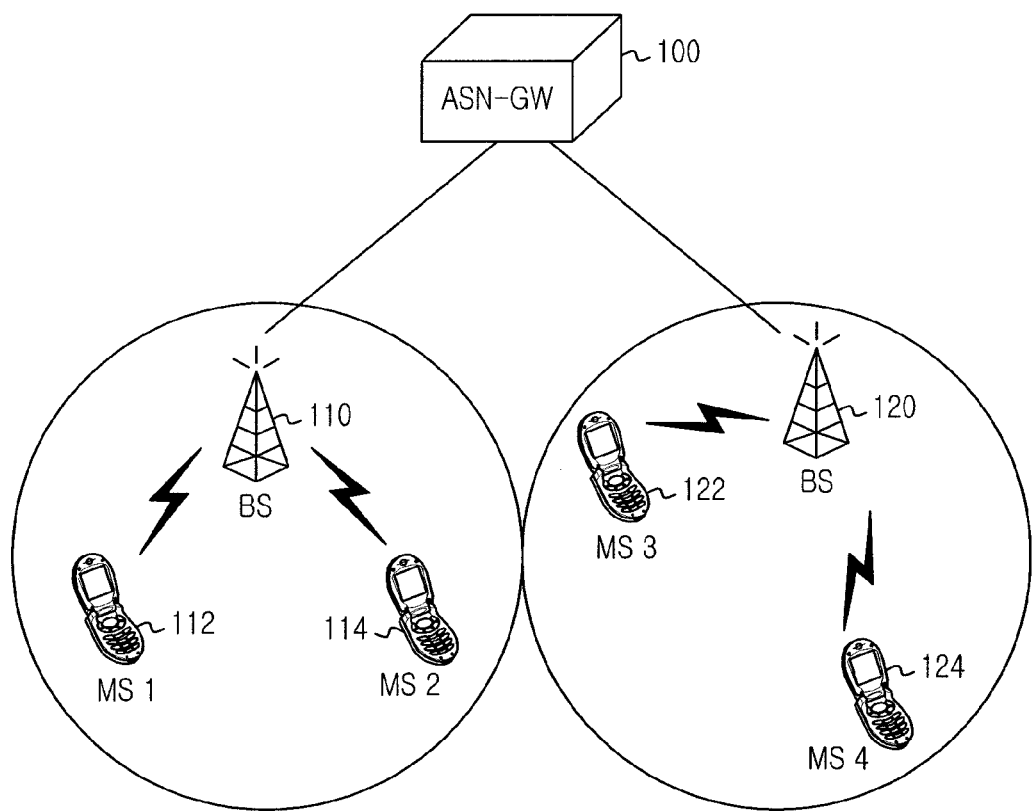
FIG. 1 is a diagram illustrating a configuration of a communication system according to an exemplary embodiment of the present invention.

FIG. 1 is a diagram illustrating a configuration of a communication system according to an exemplary embodiment of the present invention.

Referring to FIG. 1, the communication system may include an ASN-GW 100, a first BS 110, a second BS 120, and MSs 112, 114, 122 and 124.

The first BS 110 and the second BS 120 determine whether a communication service may be provided through the ASN-GW 100. For example, the first BS 110 and the second BS 120 transmit a state detection request message to the ASN-GW 100. Upon receiving a response message corresponding to the state detection request message from the ASN-GW 100, the first BS 110 and the second BS 120 determine that communication with a backhaul is maintained and that the communication service may be provided. On the other hand, upon failing to receive the response message corresponding to the state detection request message from the ASN-GW 100 within a reference time period, i.e., a predetermined time period, after transmission of the state detection request message, the first BS 110 and the second BS 120 determine that the communication with the backhaul is interrupted. In this case, the first BS 110 and the second BS 120 may retransmit the state detection request message to the ASN-GW 100 a predetermined number of times in order to determine whether a service can be provided through the backhaul.

As another example, the ASN-GW 100 may transmit a state detection request message to the first BS 110 and the second BS 120 in order to determine whether a service may be provided through the backhaul. Upon receiving the state detection request message, the first BS 110 and the second BS 120 transmit response messages corresponding to the state detection request message to the ASN-GW 100. In this case, the first BS 110 and the second BS 120 determine that the communication with the backhaul is maintained. On the other hand, upon failing to receive the state detection request message during a reference time period, i.e., a predetermined time period, the first BS 110 and the second BS 120 determine that the communication with the backhaul is interrupted.

When communication between the first BS 110 and the ASN-GW 100 is interrupted, the first BS 110 determines that the communication with the backhaul is also interrupted. In this case, the first BS 110 transmits backhaul error occurrence information to the MSs 112 and 114. Thereafter, the first BS 110 selects a BS from among neighbor BSs as a target BS so as to perform a network entry process. In this case, the first BS 110 may convert so as to operate in a relay mode in order to provide a relay service, according to relay mode conversion information received from the target BS. Herein, the relay mode conversion information may include relay mode indication information and a Relay Station (RS) identifier and preamble information.

Hereinafter, a description will be given of a method for a BS to operate in a relay mode.

Figure 2:
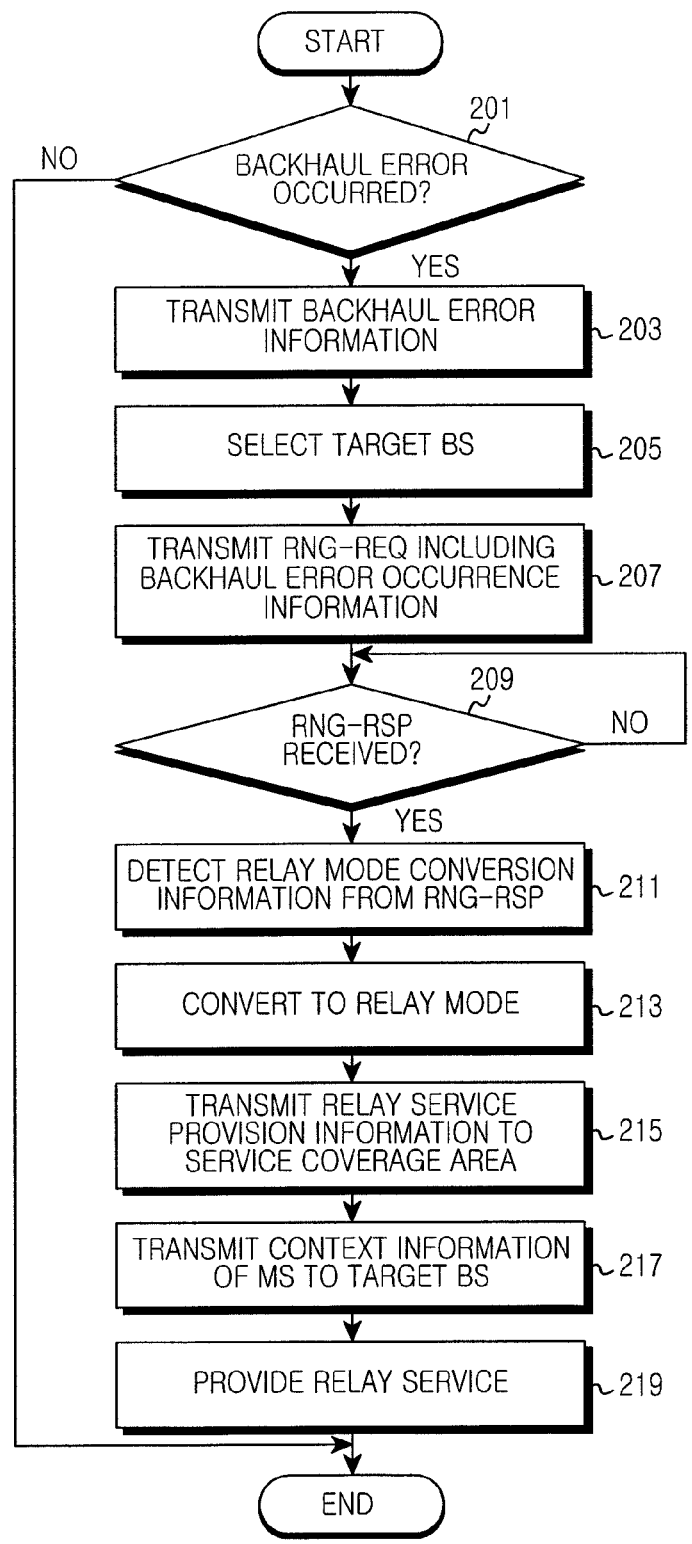
FIG. 2 is a flow diagram illustrating a process for a Base Station (BS) to operate in a relay mode in a communication system according to an exemplary embodiment of the present invention.

FIG. 2 is a flow diagram illustrating a process for a BS to operate in a relay mode in a communication system according to an exemplary embodiment of the present invention.

Referring to FIG. 2, in step 201, the BS determines whether a backhaul error occurs. That is, the BS determines whether communication with a backhaul is interrupted. For example, as described with reference to FIG. 1, the BS transmits a state detection request message to an ASN-GW. Upon receiving a response message corresponding to the state detection request message from the ASN-GW, the BS determines that a service can be provided through the backhaul. On the other hand, when failing to receive a response message corresponding to the state detection request message within a reference time period after transmission of the state detection request message, the BS then determines that the communication with the backhaul is interrupted. As another example, the BS determines whether a state detection request message is received from an ASN-GW, and upon receiving the state detection request message, the BS then determines that communication with the backhaul is maintained. Accordingly, the BS transmits a response message corresponding to the state detection request message to the ASN-GW. On the other hand, upon failing to receive the state detection request message during a reference time period, the BS determines that the communication with the backhaul is interrupted. If the communication with the backhaul is maintained, i.e., the BS determines that there no backhaul error has occurred in step 201, then the BS ends the process illustrated in FIG. 2 according to the present exemplary embodiment.

On the other hand, when the BS determines that the communication with the backhaul is interrupted in step 201, then the BS proceeds to step 203. In step 203, the BS transmits backhaul error occurrence information to a service coverage area. For example, the BS adds the backhaul occurrence information to a broadcast message, such as a Neighbor BS Advertisement (NBR-ADV) message, a Downlink Channel Descriptor (DCD), or any other suitable broadcast message, and then transmits the message to the service coverage area. As another example, the BS generates a control message including the backhaul occurrence information and transmits the same to the service coverage area.

In step 205, the BS selects a target BS for network entry from among the neighbor BSs. For example, in order to select the target BS, the BS may estimate channel states of the neighbor BSs so as to select the target BS according to the channel states. As another example, the BS may select the target BS according to predetermined neighbor BS information.

After the target BS has been selected, then, in step 207, the BS transmits a Ranging Request (RNG-REQ) message, including the backhaul error occurrence information, to the target BS. For example, the BS transmits the RNG-REQ message to the target BS by using wired resources, i.e., through a wired network, or wireless resources available for communication between BSs. Herein, the RNG-REQ message may include the backhaul error occurrence information and identification information of the BS. In this case, the RNG-REQ message may further include information indicating that a node transmitting the ranging request message is not an MS but rather, is a BS instead. For example, the ranging request message may use an MS Type field in order to indicate that a node transmitting the ranging request message is a BS rather than an MS.

Next, in step 209, the BS determines whether a Ranging Response (RNG-RSP) message is received from the target BS. Upon failing to receive the RNG-RSP message within a predetermined time period after transmission of the RNG-RSP message, the BS may retransmit the RNG-REQ message a predetermined number of times.

If it is determined that the RNG-RSP message is received in step 209, then the BS proceeds to step 211 and detects relay mode conversion information from the RNG-RSP message. Herein, the relay mode conversion information may include relay mode indication information, a RS identifier, and preamble information to be used when the BS operates in a relay mode. Next, in step 213, the BS converts or switches to a relay mode according to the relay mode conversion information detected in step 211. Thereafter, in step 215, the BS transmits relay service provision information to the service coverage area. For example, the BS may transmit a broadcast message including relay service provision information, or, alternatively, the BS may generate a control message including relay service provision information and transmit the same to the service coverage area.

Next, in step 217, the BS transmits context information of at least one MS connected to the BS to the target BS. In this case, the BS stores and manages the context information of the MS that is transmitted to the target BS. Herein, the context information of the MS may include a MAC address of the MS, security information of the MS, and an IP address of the MS. After transmitting the context information, the BS, in step 219, provides a relay service. For example, the BS transmits a signal received from the target BS to the corresponding MS, and transmits a signal, including data, received from an MS of the service coverage area to the target BS. Thereafter, the BS ends the algorithm according to the present invention.

Although not illustrated in FIG. 2, the BS may configure a connection with the target BS after completion of a network entry process with the target BS. For example, according to the Institute of Electrical and Electronic Engineers (IEEE) 802.16e standards, the BS configures a connection with the target BS in order to receive the allocation of a Connection IDentification (CID). Alternatively, according to the IEEE 802.16m standards, the BS may configure a connection with the target BS in order to receive the allocation of a Station IDentification (STID) and a Flow IDentification (FID). In this case, the BS configures the connection with the target BS using a Dynamic Service Addition/Change/Deletion (DSx) message or operation.

In the exemplary embodiment of FIG. 2, after the converting of the BS to a relay mode, the BS transmits the relay service provision information to the MS of the service coverage area, as described in steps 213 and 215. However, according to another exemplary embodiment, the BS may transmit the relay service provision information to the MS of the service coverage area upon completion of a network entry process with the target BS.

Hereinafter, a description will be given of an operation method of a target BS when a BS requests a network entry as illustrated in FIG. 2.

Figure 3:
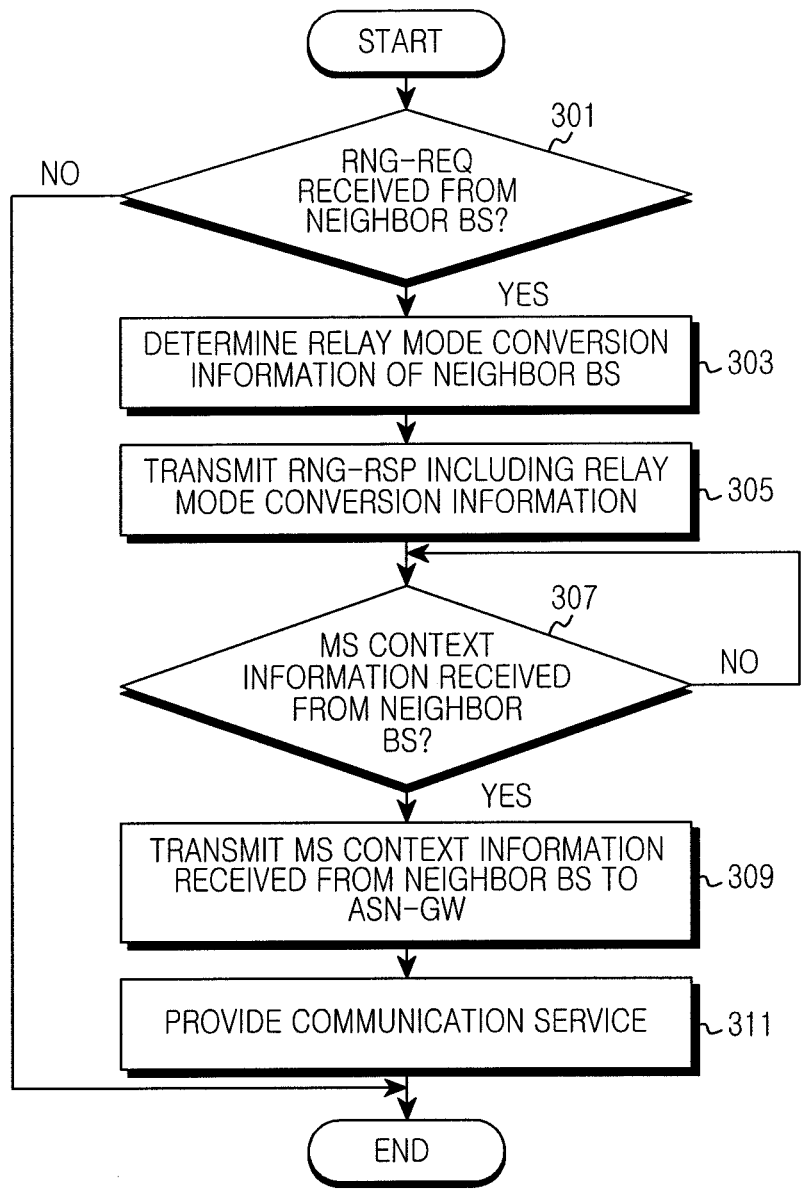
FIG. 3 is a flow diagram illustrating a process for a BS to control a relay mode conversion of a neighbor BS in a communication system according to an exemplary embodiment of the present invention.

FIG. 3 is a flow diagram illustrating a process for a BS to control a relay mode conversion of a neighbor BS in a communication system according to an exemplary embodiment of the present invention.

Referring to FIG. 3, in step 301, the BS determines whether a RNG-REQ message is received from a neighbor BS. For example, the BS determines whether a RNG-REQ message is received from a neighbor BS through wired resources or through wireless resources available for communication between BSs. In this case, the BS may determine that the RNG-REQ message is received from the neighbor BS through an MS Type field of the RNG-REQ message. Alternatively, the BS may determine that the RNG-REQ message is received from the neighbor BS through BS identification information included in the RNG-REQ message. If a RNG-REQ message is not received from a neighbor BS in step 301, then the BS ends the process according to the present exemplary embodiment.

When the BS determines that a RNG-REQ message is received from a neighbor BS, then the BS determines that communication between the neighbor BS and a backhaul is interrupted. The BS makes this determination using backhaul error occurrence information included in the RNG-REQ message. Accordingly, in step 303, the BS determines relay mode conversion information for the neighbor BS to convert to a relay mode. The relay mode conversion information may include relay mode indication information, a RS identifier, and preamble information to be used when the neighbor BS operates in a relay mode.

Next, in step 305, the BS transmits a RNG-RSP message including the relay mode conversion information to the neighbor BS. In step 307, the BS determines whether context information corresponding to at least one MS connected to the neighbor BS is received from the neighbor BS. The MS context information may include a MAC address of the MS, security information of the MS, and an IP address of the MS, or other similar context information.

When receiving the context information corresponding to the MS, the BS may determine the MS that is connected to the neighbor BS that has converted to a relay mode. Thus, if the BS determines that the context information is received in step 307, then, in step 309, the BS transmits the MS context information received from the neighbor BS to an ASN-GW in order to receive a signal to be transmitted to the MS connected to the neighbor BS. That is, the BS transmits the context information of the MS received from the neighbor BS to the ASN-GW so that when the ASN-GW receives a signal to be transmitted to the MS via the neighbor BS through the backhaul, the ASN-GW transmits the received signal to the neighbor BS via the BS.

Thereafter, in step 311, the BS provides a communication service. For example, through destination information of a signal received from the ASN-GW, the BS transmits the signal to the neighbor BS or the MS of the service coverage area. Also, the BS transmits a signal, received from the neighbor BS or the MS of the service coverage area, to the ASN-GW. Next, the BS may end the process illustrated in the present exemplary embodiment of FIG. 3.

In the present exemplary embodiment, the target BS uses the RNG-RSP message to transmit the relay mode conversion information to the BS that is unable to communicate with the backhaul. However, according to another exemplary embodiment, the target BS may transmit the relay mode conversion information to the BS through a separate control message after completion of a network entry process with the BS that is unable to communicate with the backhaul. In such a case, the BS operates as illustrated in FIG. 4.

Figure 4:
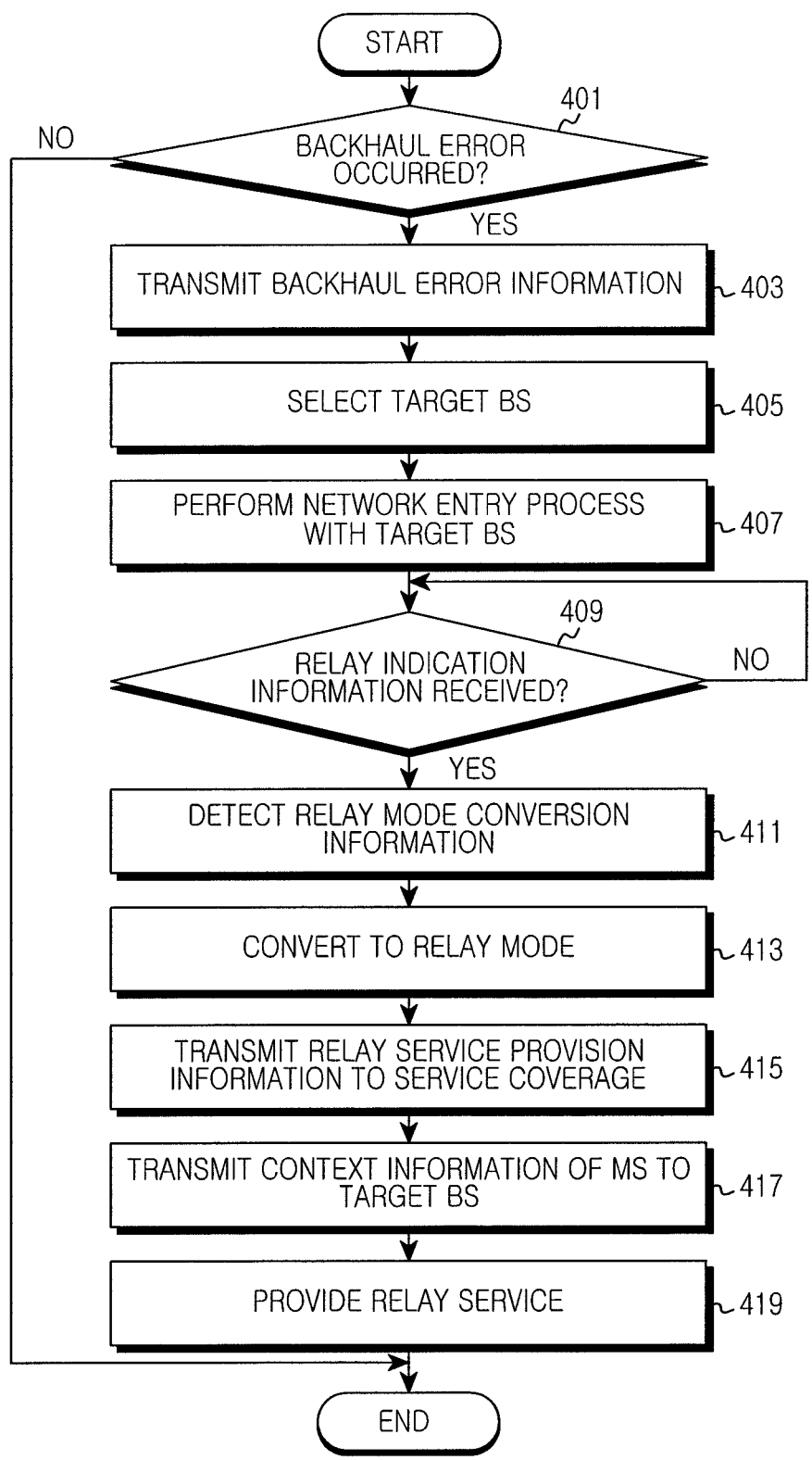
FIG. 4 is a flow diagram illustrating a process for a BS to operate in a relay mode in a communication system according to another exemplary embodiment of the present invention.

FIG. 4 is a flow diagram illustrating a process for a BS to operate in a relay mode in a communication system according to another exemplary embodiment of the present invention.

Referring to FIG. 4, in step 401, the BS determines whether a backhaul error occurs. The BS determines whether the backhaul error occurs in a manner similar to that as described with reference to FIG. 2, and thus, for the purpose of brevity, a description thereof is not included herein. If it is determined that the communication with the backhaul is maintained, the BS ends the process illustrated with respect to the present exemplary embodiment of FIG. 4.

On the other hand, when the BS determines that the communication with the backhaul is interrupted in step 401, then the BS proceeds to step 403 and transmits backhaul error occurrence information to a service coverage area. For example, the BS may add backhaul occurrence information to a broadcast message such as a NBR-ADV message and a DCD and transmit the same to the service coverage area. According to another exemplary embodiment, the BS may generate a control message including the backhaul occurrence information and transmit the same to the service coverage area.

Next, in step 405, the BS selects a target BS for network entry from among neighbor BSs. In order to select the target BS, the BS may estimate the channel states of the neighbor BSs in order to select the target BS, or, alternatively, the BS may select the target BS according to predetermined neighbor BS information.

After selecting the target BS in step 405, the BS, in step 407, performs a network entry process with the target BS. For example, the BS may perform a network entry process such as a ranging process, an authentication process, and a registration process with the target BS. In this case, the BS may transmit a RNG-REQ message including the backhaul error occurrence information and the BS identification information to the target BS.

Next, in step 409, the BS determines whether relay indication information is received from the target BS. For example, the BS determines whether a High Reliability-Command (HR-CMD) message including relay mode conversion information is received. The relay mode conversion information may include relay mode indication information, a RS identifier, preamble information, and other similar information to be used when the BS operates in a relay mode.

Upon determining that the relay indication information has been received from the target BS, the BS then proceeds to step 411 in order to detect relay mode conversion information contained in the relay indication information. Next, in step 413, the BS converts to a relay mode according to the relay mode conversion information.

Thereafter, in step 415, the BS transmits relay service provision information to the service coverage area. For example, the BS may transmit a broadcast message including the relay service provision information. Alternatively, the BS may generate a control message including relay service provision information and transmits the control message to the service coverage area. Next, in step 417, the BS transmits context information of at least one MS connected to the BS to the target BS. In this case, the BS stores and manages the context information of the MS that is transmitted to the target BS, and the context information of the MS may include a MAC address of the MS, security information of the MS, an IP address of the MS, or any other similar information.

Next, in step 419, the BS provides a relay service. For example, the BS may transmits a signal received from the target BS to the corresponding MS, and may transmit a signal received from an MS of the service coverage area to the target BS. Thereafter, the BS ends the process of the present exemplary embodiment of FIG. 4.

Although not illustrated in FIG. 4, the BS may configure a connection with the target BS before providing a relay service, after completion of a network entry process with the target BS. For example, according to the IEEE 802.16e standards, the BS may configure a connection with the target BS to receive the allocation of a Connection IDentification (CID). Alternatively, according to the IEEE 802.16m standards, the BS may configure a connection with the target BS to receive the allocation of a Station IDentification (STID) and a Flow IDentification (FID). In this case, the BS may configure the connection with the target BS using a DSx message.

Figure 5:
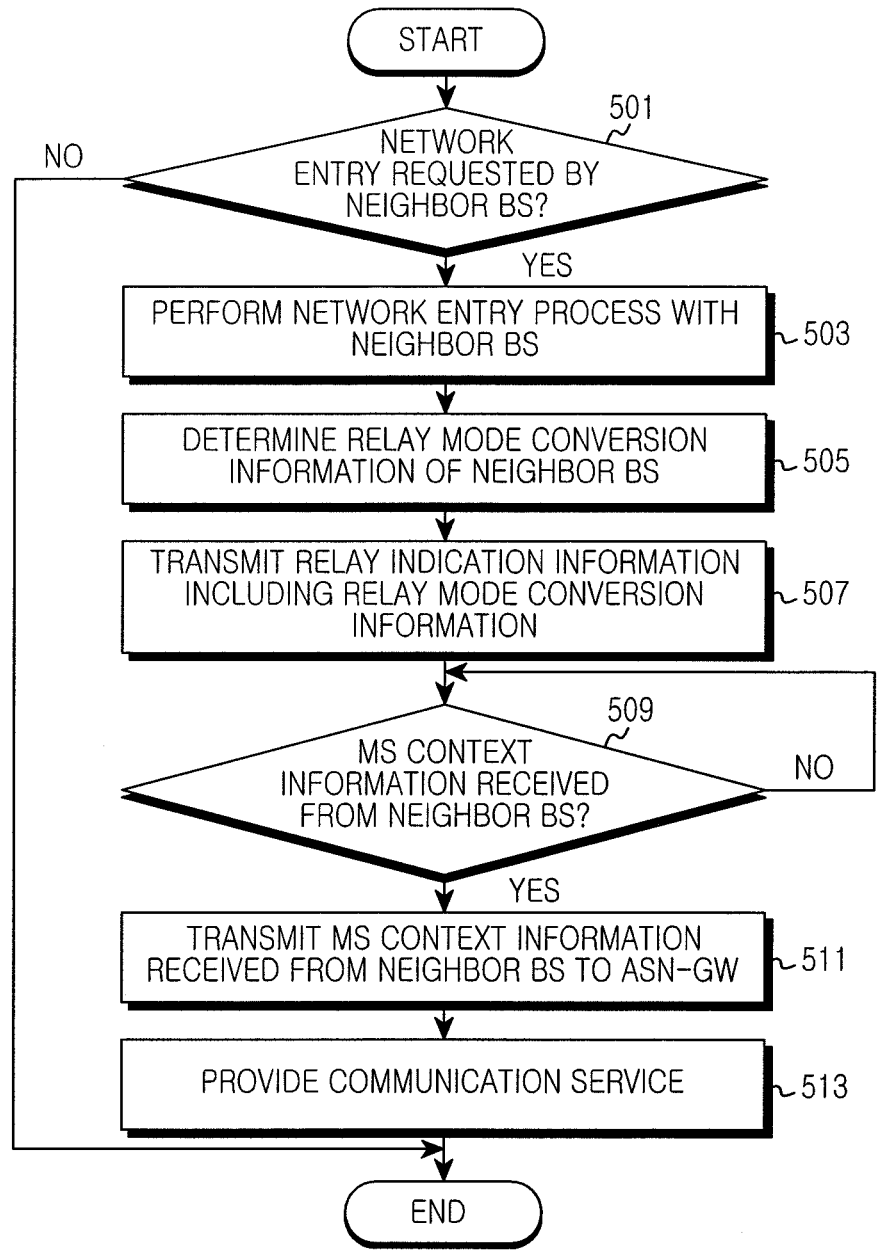
FIG. 5 is a flow diagram illustrating a process for a BS to control a relay mode conversion of a neighbor BS in a communication system according to another exemplary embodiment of the present invention.

In the exemplary embodiment of FIG. 5, after the converting of the BS to a relay mode, the BS transmits the relay service provision information to the MS of the service coverage area, as described in steps 413 and 415. However, according to another exemplary embodiment, the BS may transmit the relay service provision information to the MS of the service coverage area upon completion of the network entry process with the target BS of step 407.

Hereinafter, a description will be given of an operation method of a target BS when a BS requests a network entry as illustrated in FIG. 4.

FIG. 5 is a flow diagram illustrating a process for a BS to control a relay mode conversion of a neighbor BS in a communication system according to another exemplary embodiment of the present invention.

Referring to FIG. 5, in step 501, the BS determines whether a neighbor BS requests a network entry. For example, the BS may determine whether a RNG-REQ message from the neighbor BS is received through wired resources or wireless resources available for communication between BSs. If a network entry is not requested by the neighbor BS, then the BS ends the process of the exemplary embodiment of FIG. 5.

If it is determined that a network entry is requested by the neighbor BS in step 501, then the BS proceeds to step 503 and performs a network entry process. The network entry process may be at least one of a ranging process, an authentication process, a registration process with the neighbor BS, or any other similar process. In this case, the BS may determine that communication for the neighbor BS with a backhaul is interrupted through backhaul error occurrence information included in a ranging request message received from the neighbor BS.

Next, in step 505, the BS determines relay mode conversion information for the neighbor BS to convert to a relay mode. The relay mode conversion information may include relay mode indication information, a RS identifier, preamble information, and other similar information to be used when the neighbor BS operates in a relay mode.

Thereafter, in step 507, the BS transmits relay indication information including the relay mode conversion information to the neighbor BS. For example, the BS may transmit a HR-CMD message including the relay mode conversion information to the neighbor BS. Next, in step 509, the BS determines whether context information corresponding to at least one MS connected to the neighbor BS is received from the neighbor BS. Herein, the MS context information may include a Media Access Control (MAC) address of the MS, security information of the MS, an IP address of the MS, or other similar information.

If the context information about the MS is received, then the BS may determine the MS connected to the neighbor BS that has converted to a relay model. Accordingly, in step 511, the BS transmits the MS context information received from the neighbor BS to an ASN-GW in order for the BS to receive a signal to be transmitted to the MS connected to the neighbor BS. That is, the BS transmits the context information of the MS received from the neighbor BS to the ASN-GW so that when the ASN-GW receives a signal that is to be transmitted to the neighbor BS through the backhaul, the ASN-GW transmits the signal to the neighbor BS via the BS. Thereafter, in step 513, the BS provides a communication service. For example, through destination information of a signal received from the ASN-GW, the BS transmits the signal to the neighbor BS or the MS of the service coverage area. Also, the BS transmits a signal, received from the neighbor BS or the MS of the service coverage area to the ASN-GW. Thereafter, the BS ends the process of the exemplary embodiment of FIG. 5.

As illustrated in FIGS. 3 and 5, when the BS transmits the context information of the corresponding MS that was received from the neighbor BS to a ASN-GW, the ASN-GW transmits a signal, which is to be transmitted to the corresponding MS, to the BS according to the context information of the corresponding MS. For example, referring to FIG. 1, when the first BS 110 connects with the second BS 120 due to the interruption of communication between the first BS 110 and the backhaul, the first BS 110 transmits the context information of MSs located in the service coverage area to the second BS 120. Thereafter, the second BS 120 transmits the context information of the MS received from the first BS 110 to the ASN-GW 100. When the context information of the MS includes the context information of the first MS 112 and the second MS 114, the ASN-GW 100 determines that the signals to be transmitted to the first MS 112 and the second MS 114 can be transmitted to the first BS 110 via the second BS 120.

Hereinafter, a description will be given of an operation of an MS that receives backhaul error occurrence information from a serving BS.

Figure 6:
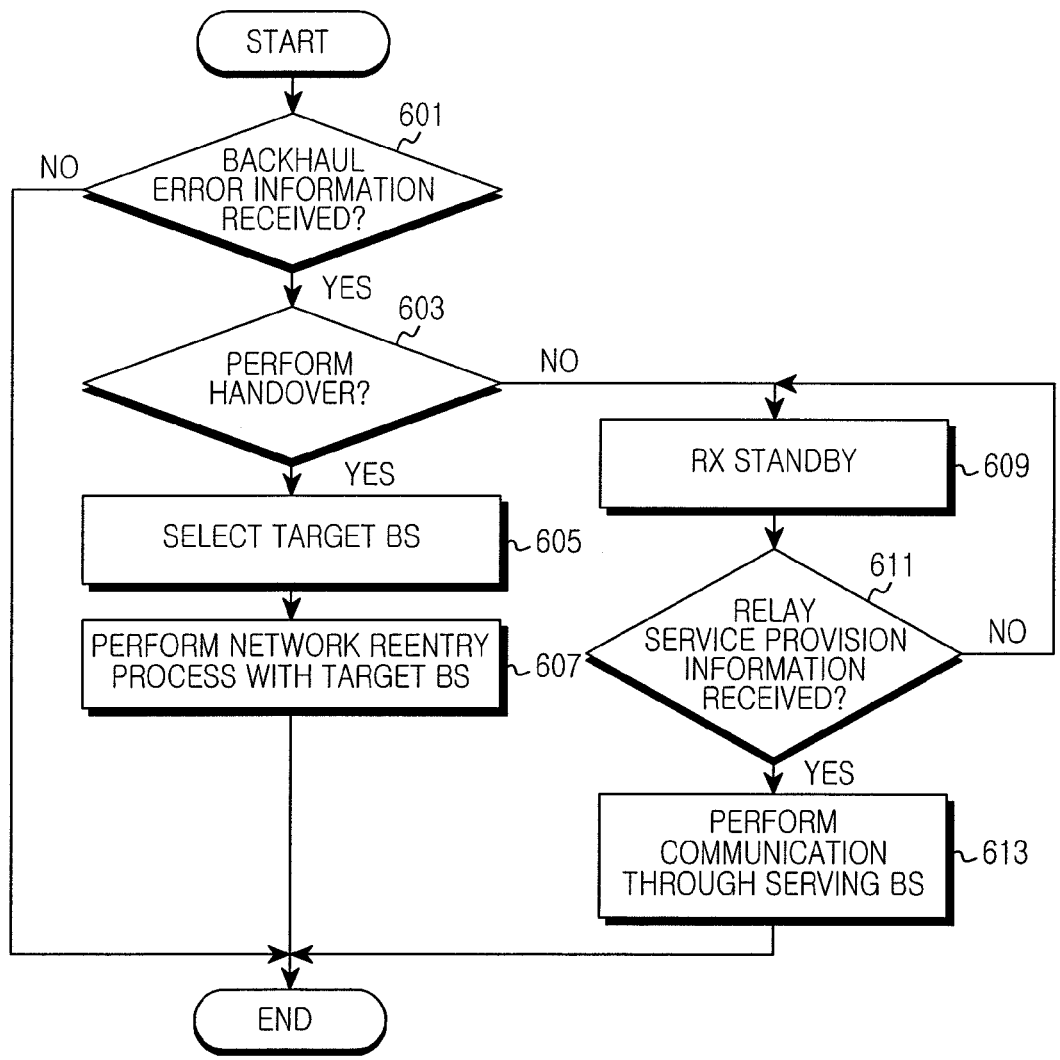
FIG. 6 is a flow diagram illustrating an operation process of a Mobile Station (MS) in a communication system according to an exemplary embodiment of the present invention.

FIG. 6 is a flow diagram illustrating an operation process of an MS in a communication system according to an exemplary embodiment of the present invention.

Referring to FIG. 6, in step 601, the MS determines whether backhaul error occurrence information is received from a serving BS. For example, the MS may determine whether a broadcast message, a control message, or any other similar message, including backhaul error occurrence information is received from the serving BS. If the backhaul error occurrence information is not received from the serving BS, then the MS ends the process illustrated in the exemplary embodiment of FIG. 6.

On the other hand, if it is determined that the backhaul error occurrence information is received from the serving BS, then the MS determines that communication between the serving BS and a backhaul is interrupted. Accordingly, the MS proceeds to step 603 in order to determine whether to perform a handover to a neighbor BS. Upon determining that a handover to a neighbor BS is to be performed, the MS proceeds to step 605 in order to select a target BS for a handover from among neighbor BSs.

Next, in step 607, the MS performs a network re-entry process with the target BS. For example, the MS may perform an uncontrolled handover with the target BS. Also, when transmitting a ranging request message for a network re-entry to the target BS, the MS may add backhaul error occurrence information corresponding to a serving BS to the ranging request message in order to notify the target BS of the backhaul error occurrence of the serving BS.

On the other hand, if the MS, in step 603, determines that a handover to a neighbor BS is not to be performed, then the MS proceeds to step 609 so as to operate in a Receive (RX) standby mode while maintaining a connection with the serving BS. In this case, a Transmit (TX) mode of the MS is deactivated. Next, in step 611, the MS determines whether relay service provision information is received from the serving BS.

If it is determined that relay service provision information is not received from the serving BS in step 611, the MS returns to step 609 so that the MS operates in the RX standby mode. However, if it is determined that relay service provision information is received from the serving BS in step 611, then the MS determines that the serving BS has converted to a relay mode and that the backhaul may be communicated with through the serving BS, and proceeds to step 613 in order to perform communication through the serving BS. Thereafter, the MS ends the process illustrated in the exemplary embodiment of FIG. 6.

Although not illustrated in FIG. 6, when the MS performs a handover to the target BS, the MS may transmit a Handover Indication (HO-IND) message, including identification information of the target BS, to the serving BS. In this case, the serving BS determines that the MS is to be handed over another BS. Accordingly, the serving BS transmits context information of the MS to the target BS having performed a network entry and does not transmit the context information of the MS having performed the handover to the target BS.

Figure 7:
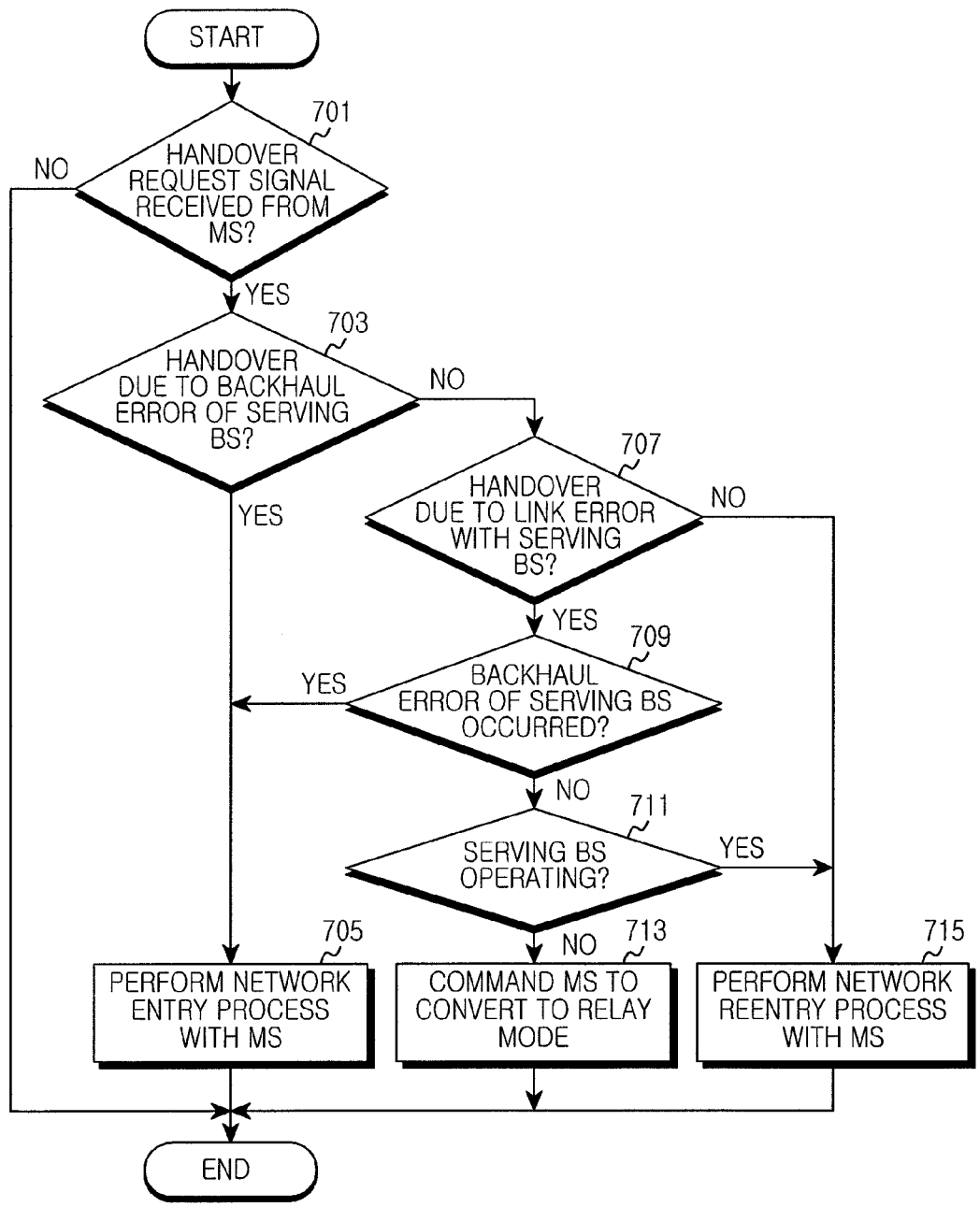
FIG. 7 is a flow diagram illustrating a process for a BS to control a handover of an MS in a communication system according to an exemplary embodiment of the present invention.

FIG. 7 is a flow diagram illustrating a process for a BS to control a handover of an MS in a communication system according to an exemplary embodiment of the present invention.

Referring to FIG. 7, in step 701, the BS determines whether a handover request message is received from the MS. If the BS determines that a handover request message is not received from the MS, then the BS ends the process of the exemplary embodiment of FIG. 7. On the other hand, if the BS determines that a handover request message is received from the MS, then the BS proceeds to step 703 and determines whether the MS has requested a handover due to a backhaul error of a serving BS of the MS. For example, the BS may determine whether a backhaul error has occurred in the serving BS of the MS through a ranging request message received from the MS. Herein, the serving BS is a BS connected before the handover of the MS.

If it is determined that the MS has requested a handover due to a backhaul error of a serving BS in step 703, then the BS proceeds to step 705 and performs a full network re-entry process with the MS. That is, because the BS cannot receive information of the MS from the serving BS via the backhaul, the BS performs a network entry process in the same manner as if the MS were initially entering a network of the BS.

On the other hand, when the BS determines that the handover request of the MS is not due to a backhaul error of a serving BS of the MS, then the BS proceeds to step 707 and determines whether the MS has requested a handover due to a link error with a serving BS. If it is determined that the handover request of the MS is not due to a link error of the serving BS in step 707, then the BS determines that the MS has requested a handover due to a movement of the MS and proceeds to step 715 in order to perform a normal network re-entry process with the MS. For example, the BS may perform a network re-entry process with the MS by receiving information of the MS from the serving BS of the MS.

On the other hand, if, in step 707, if the BS determines that the MS has requested a handover due to a link error with a serving BS, then the BS proceeds to step 709 and determines whether a backhaul error has occurred in the serving BS. For example, the BS may determine whether a backhaul error has occurred in the serving BS through a RNG-REQ message. When the BS determines that a backhaul error has occurred in the serving BS, then the BS proceeds to step 705 in order to perform a network entry process with the MS. That is, because the BS cannot receive information of the MS from the serving BS via the backhaul, the BS performs a network entry process in the same manner as if the MS were initially entering a network of the BS.

When the BS determines that a backhaul error has not occurred in the serving BS, then the BS proceeds to step 711 and determines whether the serving BS is operating. That is, the BS determines whether the serving BS can provide a service to the MSs within the service coverage area. When the serving BS is not operating, then the BS proceeds to step 713 and commands the MS to convert to a relay mode.

On the other hand, when it is determined that the serving BS is operating in step 711, then the BS proceeds to step 715 in order to perform a network re-entry process with the MS. For example, the BS may perform a network re-entry process with the MS by receiving information of the MS from the serving BS of the MS. Thereafter, the BS ends the process of the exemplary embodiment of FIG. 7.

In the present exemplary embodiment, the BS may determine whether a backhaul error has occurred in the serving BS through a RNG-REW message received from the MS. However, the present invention is not limited thereto, and according to another exemplary embodiment, when the MS requests a handover, the BS may determine whether a backhaul error has occurred in the serving BS through a separate wired interface connected to the serving BS of the MS. Herein, the wired interface may include an R8 interface.

Also, in the present exemplary embodiment, when the handover request of the MS is not due to a backhaul error of the serving BS of the MS, then the BS commands the MS to convert to a relay mode. However, the present invention is not limited thereto, and according to another exemplary embodiment, even when the handover request of the MS is not due to a backhaul error of the serving BS of the MS, the BS may control the MS to perform a handover.

Hereinafter, a description will be given of a configuration of a BS for converting to a relay mode.

Figure 8:
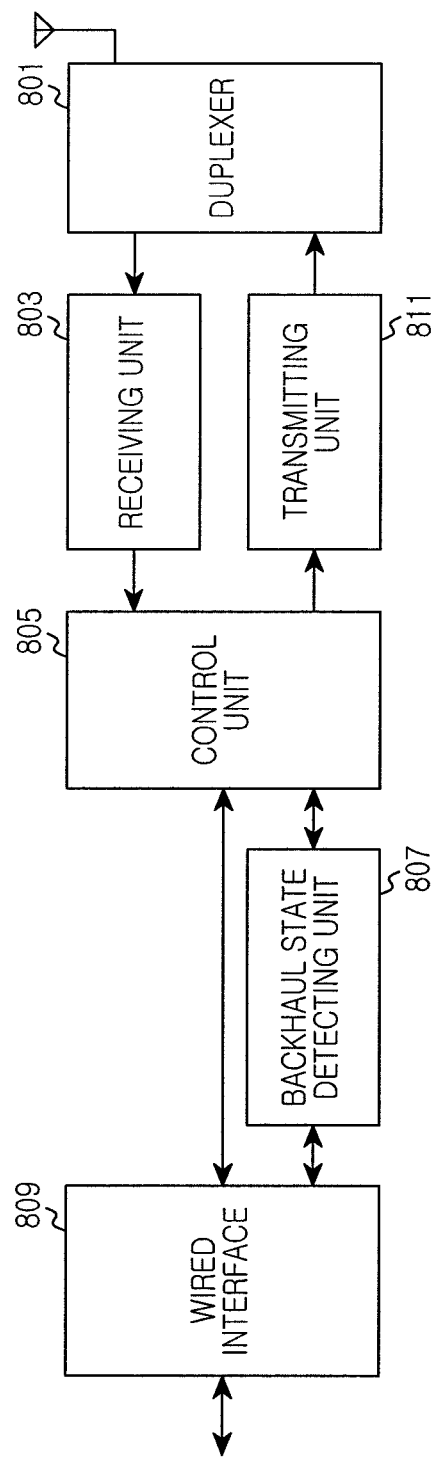
FIG. 8 is a block diagram illustrating a configuration of a BS for a relay mode conversion in a communication system according to an exemplary embodiment of the present invention.

FIG. 8 is a block diagram illustrating a configuration of a BS for relay mode conversion in a communication system according to an exemplary embodiment of the present invention.

Referring to FIG. 8, the BS may include a duplexer 801, a receiving unit 803, a control unit 805, a backhaul state detecting unit 807, a wired interface 809, and a transmitting unit 811.

According to a duplexing scheme, the duplexer 801 transmits a TX signal, received from the transmitting unit 811, through an antenna, and provides an RX signal, received from the antenna, to the receiving unit 803. The receiving unit 803 converts a Radio Frequency (RF) signal, received from the duplexer 801, into a baseband signal and demodulates the RF signal. For example, although not shown, the receiving unit 803 may include an RF processing block, a demodulating block, a channel decoding block, and a message processing block. The RF processing block may convert an RF signal, received from the duplexer 801, into a baseband signal and output the baseband signal. The demodulating block may perform a Fast Fourier Transform (FFT) operation on a signal, received from the RF processing block, in order to extract data carried on each subcarrier. The channel decoding block may include a demodulator, a deinterleaver, and a channel decoder. The message processing block may extract control information from an RX signal and provide the control information to the control unit 805.

The control unit 805 controls an overall operation of the BS. According to the present exemplary embodiment, the control unit 805 controls a relay mode conversion and an operation of the BS, as illustrated in FIGS. 2 and 4. For example, when the backhaul state detecting unit 807 detects an interruption of communication with a backhaul, the control unit 805 performs a control operation to transmit backhaul error occurrence information to at least one MS located in a service coverage area. Thereafter, the control unit 805 selects a neighbor BSs as a target BS and performs a network entry process with the target BS. Thereafter, according to relay mode conversion information received from the target BS, the control unit 805 controls the BS to convert to a relay mode and provide a relay service. Herein, the relay mode conversion information may include relay mode indication information, an RS identifier, preamble information, or other similar information to be used when the BS operates in a relay mode.

Also, when the BS converts to a relay mode, the control unit 805 performs a control operation to transmit relay service provision information to a service coverage area, and performs a control operation to transmit a context, which also may be referred to as context information, of at least one MS, connected to the BS, to the target BS. In this case, the control unit 805 stores and manages the context information of an MS transmitted to the target BS. Herein, the context information of the MS may include a MAC address of the MS, security information of the MS, an IP address of the MS, or other similar information. After completing the network entry process with the target BS, the control unit 805 performs a control operation in order to configure a connection with the target BS.

The backhaul state detecting unit 807 determines whether communication with a backhaul is interrupted, wherein the communication with the backhaul occurs through the wired interface 809. For example, the backhaul state detecting unit 807 transmits a state detection request message through the wired interface 809 to an ASN-GW. Upon receiving a response message about the state detection request message from the ASN-GW, the backhaul state detecting unit 807 may determine that a service can be provided through the backhaul. On the other hand, upon failing to receive a response message about the state detection request message within a reference time period after transmission of the state detection request message, then the backhaul state detecting unit 807 may determine that the communication with the backhaul has been interrupted.

Furthermore, the backhaul state detecting unit 807 may determine whether a state detection request message is received from an ASN-GW through the wired interface 809. Upon the state detection request message being received, the backhaul state detecting unit 807 may determine that communication with a backhaul is maintained. Accordingly, the backhaul state detecting unit 807 transmits a response message corresponding to the state detection request message through the wired interface 809 to the ASN-GW. On the other hand, upon failing to receive the state detection request message during a reference time period, the backhaul state detecting unit 807 may determine that the communication with the backhaul has been interrupted.

The wired interface 809 communicates signals with an ASN-GW and neighbor BSs through a wired network. The transmitting unit 811 encodes data and a control message, which are to be transmitted to a neighbor BS or an MS, converts the encoded data and control message into an RF signal, and transmits the RF signal to the duplexer 801. For example, although not shown, the transmitting unit 811 may include a message generating block, a channel encoding block, a modulating block, and an RF processing block.

The message generating block may generate a control message to be transmitted to a neighbor BS or an MS, under the control of the control unit 805. For example, when communication between the BS and the backhaul is interrupted, the message generating block generates a broadcast message or a control message including backhaul error occurrence information to be transmitted to MSs located in a service coverage area, under the control of the control unit 805. Also, the message generating block generates a RNG-REQ message to be transmitted to a target BS, under the control of the control unit 805. Herein, the RNG-REQ message may include the backhaul error occurrence information and identification information of the BS. In this case, the RNG-REQ message may further include information indicating that a node transmitting the RNG-REQ message is not an MS, but rather, is a BS. For example, the RNG-REQ message may use an MS Type field to indicate that the node transmitting the RNG-REQ message is not an MS, but rather, is a BS.

However, the present invention is not limited to the above. According to another exemplary embodiment, when the BS converts to a relay mode, the message generating block may generate a broadcast message or a control message including relay service provision information to be transmitted to MSs located in a service coverage area, under the control of the control unit 805. Also, the message generating block may generate a control message including context information of an MS connected to the BS, under the control of the control unit 805.

Furthermore, and although not shown, the channel encoding block may include a modulator, interleaver, and a channel encoder. The modulating block performs an Inverse Fast Fourier Transform (IFFT) operation to map a signal, received from the channel encoding block, to each subcarrier. Additionally, the RF processing block converts a baseband signal, received from the modulating block, into an RF signal and outputs the RF signal to the duplexer 801.

Hereinafter, a description will be given of a configuration of a BS for processing a network entry request of a neighbor BS.

Figure 9:
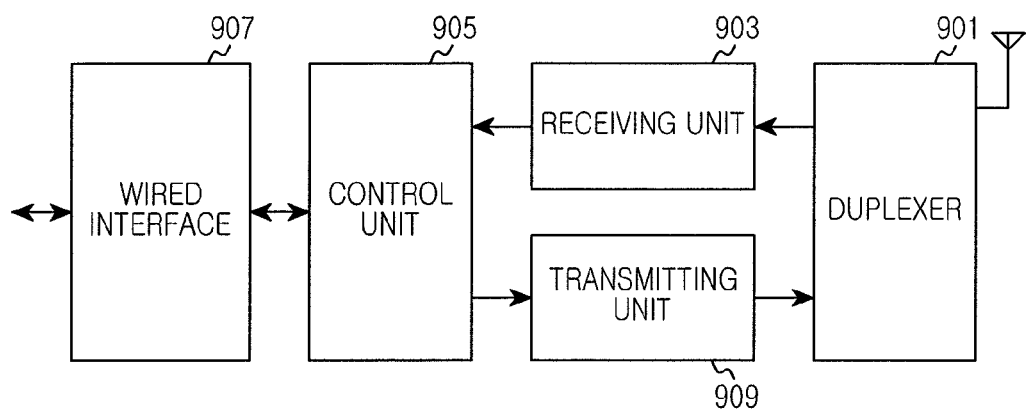
FIG. 9 is a block diagram illustrating a configuration of a BS in a communication system according to an exemplary embodiment of the present invention.

FIG. 9 is a block diagram illustrating a configuration of a BS in a communication system according to an exemplary embodiment of the present invention.

Referring to FIG. 9, the BS may include a duplexer 901, a receiving unit 903, a control unit 905, a wired interface 907, and a transmitting unit 909. According to a duplexing scheme, the duplexer 901 transmits a TX signal, received from the transmitting unit 909, through an antenna, and provides an RX signal, received from the antenna, to the receiving unit 903.

The receiving unit 903 converts an RF signal, received from the duplexer 901, into a baseband signal and demodulates the RF signal. For example, although not shown, the receiving unit 903 may include an RF processing block, a demodulating block, a channel decoding block, and a message processing block. The RF processing block may convert an RF signal, received from the duplexer 901, into a baseband signal and outputs the baseband signal. The demodulating block may perform a FFT operation on a signal, received from the RF processing block, in order to extract data carried on each subcarrier. The channel decoding block may include a demodulator, a deinterleaver, and a channel decoder. The message processing block may extract control information from an RX signal and provide the control information to the control unit 905. For example, the message processing block may extract backhaul error occurrence information of the neighbor BS from a RNG-REQ message, received from a neighbor BS, and provide the backhaul error occurrence information to the control unit 905.

The control unit 905 controls an overall operation of the BS. According to the present invention, the control unit 905 controls a neighbor BS requesting a network entry as illustrated in FIG. 3 or 5. For example, the control unit 905 controls a network entry process with a neighbor BS requesting a network entry. In this case, according to the backhaul error occurrence information of a neighbor BS received from the message processing block, the control unit 905 determines that communication between the neighbor BS and a backhaul is interrupted. Accordingly, the control unit 905 determines relay mode conversion information of the neighbor BS so that the neighbor BS can convert to a relay mode. Also, the control unit 905 performs a control operation to transmit the relay mode conversion information to the neighbor BS. Herein, the relay mode conversion information may include relay mode indication information, and RS identifier and preamble information to be used when the neighbor BS operates in a relay mode.

According to another exemplary embodiment, when receiving a context or context information of an MS from a neighbor BS having converted to a relay mode, the control unit 905 may detect an MS connected to the neighbor BS that has converted to a relay mode. Accordingly, in order to receive a signal of an MS connected to the neighbor BS from an ASN-GW, the control unit 905 may perform a control operation to transmit the context information of the MS, received from the neighbor BS, to the ASN-GW.

According to another exemplary embodiment, when an MS has requested a handover, the control unit 905 determines whether the MS has requested a handover due to a backhaul error of a serving BS. When the MS has requested a handover due to a backhaul error of a serving BS, then the control unit 905 performs a network re-entry process with the MS. In this case, the control unit 905 performs a network re-entry process with the MS according to an uncontrolled handover scheme. That is, because the control unit 905 cannot receive information of the MS from the serving BS through the backhaul, it performs a network entry process in the same manner as if the MS were initially entering a network of the BS. Herein, the serving BS is a BS connected by the MS before the handover.

According to another exemplary embodiment, when an MS has requested a handover, the control unit 905 may determine whether a backhaul error has occurred in the serving BS of the MS, through the wired interface 907. The wired interface 907 communicates signals with an ASN-GW and neighbor BSs through a wired network. For example, under the control of the control unit 905, the wired interface 907 transmits the context information of an MS, received from a neighbor BS having converted to a relay mode, to an ASN-GW.

The transmitting unit 909 encodes data and a control message, which are to be transmitted to a neighbor BS or an MS, converts the encoded data and the control message into an RF signal, and transmits the RF signal to the duplexer 901.

For example, although not shown, the transmitting unit 909 may include a message generating block, a channel encoding block, a modulating block, and an RF processing block. The message generating block may generate a control message to be transmitted to a neighbor BS or an MS, under the control of the control unit 905. For example, the message generating block may generate a RNG-RSP message including relay mode conversion information, under the control of the control unit 905. Alternatively, the message generating block may generate a relay indication message including relay mode conversion information, under the control of the control unit 905. Although not shown, the channel encoding block may include a modulator, interleaver, and a channel encoder. Additionally, the modulating block may perform an IFFT operation in order to map a signal, received from the channel encoding block, to each subcarrier. Also, the RF processing block may convert a baseband signal, received from the modulating block, into an RF signal and output the RF signal to the duplexer 901.

Figure 10:
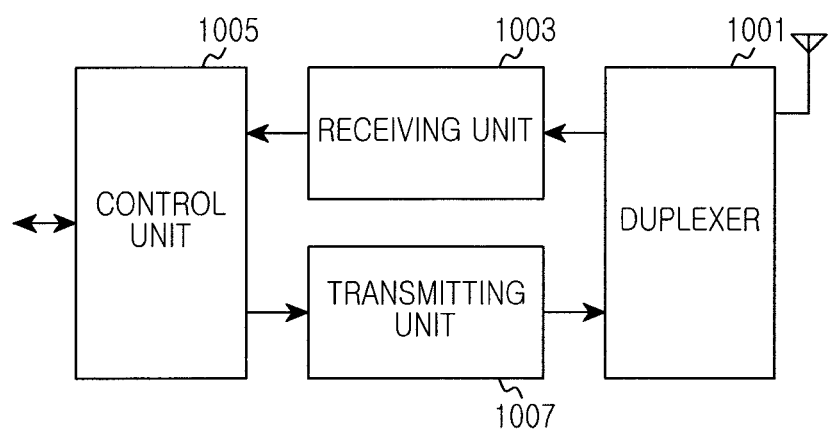
FIG. 10 is a block diagram illustrating a configuration of an MS in a communication system according to an exemplary embodiment of the present invention.

FIG. 10 is a block diagram illustrating a configuration of an MS in a communication system according to an exemplary embodiment of the present invention.

Referring to FIG. 10, the MS may include a duplexer 1001, a receiving unit 1003, a control unit 1005, and a transmitting unit 1007. According to a duplexing scheme, the duplexer 1001 transmits a TX signal, received from the transmitting unit 1007, through an antenna, and provides an RX signal, received from the antenna, to the receiving unit 1003.

The receiving unit 903 converts an RF signal, received from the duplexer 1001, into a baseband signal and demodulates the RF signal. For example, although not shown, the receiving unit 903 may include an RF processing block, a demodulating block, a channel decoding block, and a message processing block. The RF processing block may convert an RF signal, received from the duplexer 1001, into a baseband signal and output the baseband signal. The demodulating block may perform a Fast Fourier Transform (FFT) operation on a signal, received from the RF processing block, in order to extract data carried on each subcarrier. The channel decoding block, although not shown, may include a demodulator, a deinterleaver, and a channel decoder. The message processing block may extract control information from an RX signal and provides the control information to the control unit 1005.

The control unit 1005 controls an overall operation of the MS. According to the present exemplary embodiment, and as illustrated in FIG. 6, when communication between a serving BS and a backhaul is interrupted, the control unit 1005 determines whether to perform a handover of the MS to a neighbor BS. Upon determining that a handover to a neighbor BS is to be performed, the control unit 1005 selects a target BS for a handover and performs a control operation for a network re-entry process with the target BS. In this case, the control unit 1005 performs a control operation in order to transmit information of the target BS to the serving BS.

On the other hand, upon determining that a handover to a neighbor BS is to be not performed, the control unit 1005 performs a control operation in order to operate the MS in an RX standby mode while maintaining a connection with the serving BS. In this case, the control unit 1005 deactivates a TX mode of the MS. Thereafter, when receiving relay service provision information from the serving BS, the control unit 1005 determines that the serving BS has converted to a relay mode in order to recover or restore communication with the backhaul. Accordingly, the control unit 1005 performs a control operation to provide a communication service through the serving BS.

The transmitting unit 1007 encodes data and a control message, which are to be transmitted to a BS, converts the encoded data and control message into an RF signal, and transmits the RF signal to the duplexer 9001. For example, although not shown, the transmitting unit 1007 may include a message generating block, a channel encoding block, a modulating block, and an RF processing block.

The message generating block may generate a control message to be transmitted to a BS, under the control of the control unit 1005. For example, when the MS is handed over to a neighbor BS due to an interruption of communication between the serving BS and a backhaul, the message generating block may generate a RNG-REQ message including backhaul error occurrence information of the serving BS, under the control of the control unit 1005. Also, the message generating block may generate a HO-IND, including identification information of the target BS, under the control of the control unit 1005.

Additionally, and although not shown, the channel encoding block may include a modulator, an interleaver, and a channel encoder. The modulating block may perform an IFFT operation to map a signal, received from the channel encoding block, to each subcarrier. The RF processing block may convert a baseband signal, received from the modulating block, into an RF signal and output the RF signal to the duplexer 1001.

In the above exemplary embodiment of FIG. 10, the BS converts to a relay mode when communication with the backhaul is interrupted. However, the present invention is not limited thereto, and according to another exemplary embodiment, when a BS cannot communicate with a neighbor BS due to the interruption of communication with a backhaul, the BS can process only the communication between MSs located in a service coverage area of the BS.

As described above with respect to the present exemplary embodiments, when communication with a backhaul is interrupted, a BS converts to a relay mode and provides a relay service. In this case, while providing a relay service, the BS determines whether communication with the backhaul is recovered. When the communication with the backhaul is recovered, the BS transmits a relay mode interruption request to a target BS connected for a relay service. When the target BS accepts the relay mode interruption request, the BS interrupts a relay mode and operates as a BS that is not performing relay operations. In this case, the BS transmits backhaul recovery information to at least one MS located in the service coverage area.

Also, according to the present exemplary embodiments, a BS determines whether communication with a backhaul is recovered when performing a network entry process with a target BS in order to convert to a relay mode. Accordingly, when the backhaul is recovered before the conversion to a relay mode, the BS transmits backhaul recovery information to at least one MS located in the service coverage area, and maintains an operation as a BS that is not performing relay operations. In this case, the MS operates in an RX standby mode according to the backhaul error occurrence information of the BS, and may resume signal transmission according to the backhaul recovery information.

As described above with respect to the present exemplary embodiments, when communication with a backhaul is interrupted, a BS of a communication system converts to a relay mode in order to provide a relay service. Accordingly, it is possible to provide a seamless service to an MS connected to the BS.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a base station (BS) in a communication system, the method comprising:
   transmitting, to at least one mobile station (MS), a first message for notifying that an error occurred in a backhaul;
   transmitting, to a target BS, a second message for notifying that the error occurred in the backhaul;
   receiving, from the target BS, a third message for operating as a relay node; and
   generating a path between the at least one MS and the target BS as the relay node.

2. The method of claim 1,
   wherein the transmitting of the first message comprises transmitting at least one of a broadcast message and a control message including information associated with the error to the at least one MS, and
   wherein the at least one MS is located in a service coverage area of the BS.

3. The method of claim 1,
   wherein the second message comprises a ranging request (RNG-REQ) message, and
   wherein the third message comprises a ranging response (RNG-RSP) message.

4. The method of claim 1, further comprising:
   transmitting information for the relay node to the at least one MS; and
   transmitting context information corresponding to the at least one MS to the target BS.

5. The method of claim 1, wherein the third message includes at least one of indication information for the relay node, an identifier of the relay node, and preamble information.

6. The method of claim 1, further comprising:
   performing a network entry process with the target BS; and
   converting to the relay node in response to the third message.

7. The method of claim 1, further comprising:
   detecting a communication state with the backhaul.

8. The method of claim 7, wherein the detecting of the communication state comprises:
   transmitting a request message for detecting the communication state, to at least one node constituting the backhaul; and
   determining that the error has occurred when a response message corresponding to the request message is not received.

9. An apparatus of a base station (BS) in a communication system, the apparatus comprising:
   a transmitting circuitry configured to:

transmit, to at least one mobile station (MS), a first message for notifying that an error occurred in a backhaul, and transmit, to a target base station BS, a second message for notifying that the error occurred in the backhaul;

a receiving circuitry configured to receive, from the target BS, a third message for operating as a relay node; and at least one processor configured to generate a path between the at least one MS and the target BS as the relay node.

10. The apparatus of claim 9, wherein the transmitting circuitry is further configured to transmit at least one of a broadcast message and a control message including information associated with the error to the at least one MS, and wherein the at least one MS is located in a service coverage area of the BS.

11. The apparatus of claim 9, wherein the second message comprises a ranging request (RNG-REQ) message, and wherein the third message comprises a ranging response (RNG-RSP) message.

12. The apparatus of claim 9, wherein the transmitting circuitry is further configured to:

transmit information for the relay node to the at least one MS, and transmit context information corresponding to the at least one MS to the target BS.

13. The apparatus of claim 9, wherein the third message includes at least one of indication information for the relay node, an identifier of the relay node, and preamble information.

14. The apparatus of claim 9, wherein the at least one processor is further configured to:
perform a network entry process with the target BS, and
convert to the relay node in response to the third message.

15. The apparatus of claim 9, wherein the at least one processor is further configured to detect a communication state with the backhaul.

16. The apparatus of claim 15, wherein the at least one processor is configured to:

transmit a request message for detecting the communication state through the transmitting circuitry to at least one node constituting the backhaul, and determine that the error has occurred in the backhaul when a response message corresponding to the request message is not received.

* * * * *